US009553638B2

(12) United States Patent
Yamaura

(10) Patent No.: US 9,553,638 B2
(45) Date of Patent: *Jan. 24, 2017

(54) WIRELESS COMMUNICATION SYSTEM, WIRELESS COMMUNICATION APPARATUS, AND WIRELESS COMMUNICATION METHOD

(71) Applicant: Sony Corporation, Tokyo (JP)

(72) Inventor: Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,411

(22) Filed: Apr. 8, 2014

(65) Prior Publication Data

US 2014/0219378 A1 Aug. 7, 2014

Related U.S. Application Data

(63) Continuation of application No. 13/958,501, filed on Aug. 2, 2013, now Pat. No. 8,731,096, which is a (Continued)

(30) Foreign Application Priority Data

Apr. 27, 2006 (JP) .................................. 2006-124537
Mar. 6, 2007 (JP) .................................. 2007-056243

(51) Int. Cl.
*H04B 7/02* (2006.01)
*H04L 1/02* (2006.01)
(Continued)

(52) U.S. Cl.
CPC .......... *H04B 7/0408* (2013.01); *H04B 7/0421* (2013.01); *H04B 7/0456* (2013.01);
(Continued)

(58) Field of Classification Search
CPC ... H04B 7/0408; H04B 7/0421; H04B 7/0617; H04B 7/0634; H04B 7/0697; H04B 7/0456
(Continued)

(56) References Cited

U.S. PATENT DOCUMENTS 6,418,175 B1 7/2002 Pukkila et al.
6,687,492 B1 2/2004 Sugar et al.
(Continued)

FOREIGN PATENT DOCUMENTS

EP 1 598 955 A2 11/2005
EP 2 011 250 A 11/2007
(Continued)

OTHER PUBLICATIONS

Extended European Search Report dated Feb. 12, 2010 corresponding to European Application No. EP 07 25 1773, 7 pages.
(Continued)

*Primary Examiner* — Phuong Phu
(74) *Attorney, Agent, or Firm* — Wolf, Greenfield & Sacks, P.C.

(57) ABSTRACT

A wireless communication system is disclosed. The system performs data transmission from a first terminal including N antennas to a second terminal including M antennas using spatially multiplexed streams (N and M are integers larger than or equal to 2).

20 Claims, 8 Drawing Sheets

Related U.S. Application Data continuation of application No. 12/926,613, filed on Nov. 30, 2010, now Pat. No. 8,699,608, which is a continuation of application No. 11/790,594, filed on Apr. 26, 2007, now Pat. No. 7,848,444.

(51) Int. Cl.
  *H04B 7/04* (2006.01)
  *H04B 7/06* (2006.01)

(52) U.S. Cl.
  CPC .......... *H04B 7/0617* (2013.01); *H04B 7/0634* (2013.01); *H04B 7/0697* (2013.01)

(58) Field of Classification Search
  USPC ........ 375/267, 260, 299, 347, 349; 455/500, 455/501
  See application file for complete search history.

(56) References Cited

U.S. PATENT DOCUMENTS

| | | |
|---|---|---|
| 6,859,503 B2 | 2/2005 | Pautler et al. |
| 7,006,848 B2 | 2/2006 | Ling et al. |
| 7,068,628 B2 | 6/2006 | Li et al. |
| 7,099,678 B2 | 8/2006 | Vaidyanathan |
| 7,110,378 B2 | 9/2006 | Onggosanusi et al. |
| 7,248,645 B2 | 7/2007 | Vialle et al. |
| 7,272,162 B2 | 9/2007 | Sano et al. |
| 7,272,168 B2 | 9/2007 | Sano et al. |
| 7,295,542 B2 | 11/2007 | Xu |
| 7,433,416 B1 | 10/2008 | Banister |
| 7,486,720 B2 | 2/2009 | Molisch et al. |
| 7,508,880 B2 | 3/2009 | Yun et al. |
| 7,570,696 B2 | 8/2009 | Maltsev et al. |
| 7,636,573 B2 | 12/2009 | Walton et al. |
| 7,706,324 B2 | 4/2010 | Sutivong et al. |
| 7,746,943 B2 | 6/2010 | Yamaura |
| 7,756,210 B2 | 7/2010 | Castelain et al. |
| 7,773,685 B2 | 8/2010 | Tirkkonen et al. |
| 7,848,444 B2 | 12/2010 | Yamaura |
| 7,949,060 B2 * | 5/2011 | Ling et al. ............... 375/260 |
| 8,194,720 B2 | 6/2012 | Yamaura |
| 8,243,749 B2 | 8/2012 | Basson et al. |
| 8,260,198 B2 | 9/2012 | Yamaura |
| 8,345,732 B2 | 1/2013 | Fischer et al. |
| 8,369,790 B2 | 2/2013 | Li et al. |
| 8,374,096 B2 | 2/2013 | Gu et al. |
| 8,532,569 B2 | 9/2013 | Yamaura |
| 8,699,477 B2 | 4/2014 | Yamaura |
| 8,699,608 B2 * | 4/2014 | Yamaura ............... 375/267 |
| 8,705,650 B2 * | 4/2014 | Yamaura ............... 375/267 |
| 8,706,028 B2 | 4/2014 | Yamaura |
| RE45,150 E | 9/2014 | Yamaura |
| 8,830,846 B2 | 9/2014 | Grandhi et al. |
| 8,964,521 B2 | 2/2015 | Hansen et al. |
| 2003/0003880 A1 | 1/2003 | Ling et al. |
| 2004/0178954 A1 | 9/2004 | Vook et al. |
| 2004/0192218 A1 | 9/2004 | Oprea |
| 2004/0199056 A1 | 10/2004 | Husemann et al. |
| 2005/0043031 A1 | 2/2005 | Cho et al. |
| 2005/0053170 A1 | 3/2005 | Catreux et al. |
| 2005/0090205 A1 | 4/2005 | Catreux-Erceg et al. |
| 2005/0213682 A1 | 9/2005 | Han et al. |
| 2006/0039328 A1 * | 2/2006 | Ihm et al. ............... 370/334 |
| 2006/0056316 A1 * | 3/2006 | Chandra et al. ......... 370/254 |
| 2006/0067718 A1 | 3/2006 | Toda et al. |
| 2006/0068718 A1 | 3/2006 | Li et al. |
| 2006/0068738 A1 | 3/2006 | Li et al. |
| 2006/0121946 A1 | 6/2006 | Walton et al. |
| 2006/0172707 A1 | 8/2006 | Stern-Berkowitz et al. |
| 2006/0250963 A1 | 11/2006 | Jin et al. |
| 2006/0270343 A1 | 11/2006 | Cha et al. |
| 2006/0291544 A1 | 12/2006 | Fischer et al. |
| 2006/0291581 A1 | 12/2006 | Onggosanusi et al. |
| 2006/0291583 A1 * | 12/2006 | Hammerschmidt .. H04W 88/06 375/295 |
| 2007/0111666 A1 | 5/2007 | Waxman |
| 2007/0160010 A1 | 7/2007 | Maltsev et al. |
| 2007/0160162 A1 | 7/2007 | Kim et al. |
| 2007/0189412 A1 | 8/2007 | Xia et al. |
| 2007/0191066 A1 | 8/2007 | Khojastepour et al. |
| 2007/0201566 A1 | 8/2007 | Solomon et al. |
| 2007/0201575 A1 | 8/2007 | Ariyavisitakul et al. |
| 2007/0253501 A1 | 11/2007 | Yamaura |
| 2007/0258541 A1 | 11/2007 | Yamaura |
| 2008/0108310 A1 | 5/2008 | Tong et al. |
| 2008/0113626 A1 | 5/2008 | Kim et al. |
| 2008/0212538 A1 | 9/2008 | Molisch |
| 2008/0261551 A1 | 10/2008 | Catreux-Erceg et al. |
| 2009/0161641 A1 | 6/2009 | Kim |
| 2009/0207765 A1 | 8/2009 | Yamaura |
| 2009/0290563 A1 | 11/2009 | Gu et al. |
| 2011/0075606 A1 | 3/2011 | Yamaura |
| 2011/0310996 A1 | 12/2011 | Raleigh et al. |
| 2012/0213300 A1 | 8/2012 | Yamaura |
| 2012/0269158 A1 | 10/2012 | Yamaura |
| 2012/0281631 A1 | 11/2012 | Yamaura |
| 2013/0129000 A1 | 5/2013 | Fischer et al. |
| 2013/0315177 A1 | 11/2013 | Yamaura et al. |
| 2013/0315222 A1 | 11/2013 | Yamaura et al. |
| 2013/0315330 A1 | 11/2013 | Yamaura et al. |
| 2013/0315331 A1 | 11/2013 | Yamaura et al. |
| 2013/0315332 A1 | 11/2013 | Yamaura et al. |
| 2013/0315333 A1 | 11/2013 | Yamaura et al. |
| 2013/0315334 A1 | 11/2013 | Yamaura et al. |
| 2013/0315335 A1 | 11/2013 | Yamaura et al. |
| 2013/0322379 A1 | 12/2013 | Yamaura et al. |
| 2013/0343369 A1 | 12/2013 | Yamaura et al. |
| 2014/0219385 A1 | 8/2014 | Yamaura |
| 2014/0254578 A1 | 9/2014 | Yamaura |

FOREIGN PATENT DOCUMENTS

| | | |
|---|---|---|
| JP | 2002-44051 | 2/2002 |
| JP | 2004-23716 | 1/2004 |
| JP | 2007-318727 | 12/2007 |
| JP | 2007-318728 | 12/2007 |
| JP | 2007-318729 | 12/2007 |
| JP | 4356756 | 8/2009 |
| JP | 4775288 | 7/2011 |
| WO | WO 2005/125044 A1 | 12/2005 |
| WO | WO 2006/129958 A1 | 12/2006 |
| WO | WO 2007/126036 A1 | 11/2007 |

OTHER PUBLICATIONS

[No Author Listed] http://radio3.ee.uec.ac.jp/MIMO(IEICE.sub.--TS).pdf. Oct. 24, 2003;:32-5.

Benjebbour et al., Comparison of Ordered Successive Receivers for Space-Time Transmission. Proc IEEE VTC. 2001;4:2053-7.

Benjebbour et al., Performance of Iterative Successive Detection Algorithm for Space-Time Transmission. Proc IEEE VTC. May 2001;2:1287-91.

Benko et al., A PHY/MAC Proposal for IEEE 802.22 WRAN Systems. Feb. 23, 2006. Doc. No. IEE 802.22-06/0005r3.

Ohwatari et al., A Study on Reduction of the Amount of Channel State Information Feedback in MIMO-OFDM Eigenbeam-Space Division Multiplexing Systems. IEICE Technical Report RCS2006-7. 2006;:1-14.

Tomcik, QFDD and QTDD: Technology Overview. IEEE 802.20 Working Group on Mobile Broadband Wireless Access. Oct. 28, 2005. Doc No. IEE C802.20-05/68.

Chinese Office Action and English translation thereof dated Oct. 10, 2014 in connection with Application No. 201210206360.8.

No Author Listed, IEEE P802.11n™/D1.0, Draft Amendment to Standard [for] Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Throughput, IEEE Draft; P802, vol. 802, 11n, No. D1.0, Mar. 9, 2006, pp. 1-335.

(56) References Cited

OTHER PUBLICATIONS

Stephens et al., Joint Proposal: High Throughput Extension to the 802.11 Standard: MAC, IEEE 802.11-05/1095r4, Jan. 13, 2006, pp. 1-103.
Xia et al. Analysis of Transmit Beamforming in IEEE 802.11 in Systems, IEEE Global Telecommunications Conference, 2006, pp. 1-5.
U.S. Appl. No. 60/780,623, filed Mar. 9, 2006, Chandra et al.
U.S. Appl. No. 14/339,032, filed Jul. 23, 2014, Yamaura.
U.S. Appl. No. 14/248,481, filed Apr. 9, 2014, Yamaura.
U.S. Appl. No. 14/284,841, filed May 22, 2014, Yamaura.
U.S. Appl. No. 11/790,592, filed Apr. 26, 2007, Yamaura.
U.S. Appl. No. 13/539,193, filed Jun. 29, 2012, Yamaura.
U.S. Appl. No. 11/913,165, filed Apr. 24, 2009, Yamaura.
U.S. Appl. No. 13/541,273, filed Jul. 3, 2012, Yamaura.
U.S. Appl. No. 13/541,294, filed Jul. 3, 2012, Yamaura.
U.S. Appl. No. 13/958,177, filed Aug. 2, 2013, Yamaura.
U.S. Appl. No. 13/958,441, filed Aug. 2, 2013, Yamaura.
U.S. Appl. No. 13/958,356, filed Aug. 2, 2013, Yamaura.
U.S. Appl. No. 13/958,484, filed Aug. 2, 2013, Yamaura.
U.S. Appl. No. 11/790,593, filed Apr. 26, 2007, Yamaura.
U.S. Appl. No. 13/460,894, filed May 1, 2012, Yamaura.
U.S. Appl. No. 13/958,369, filed Aug. 2, 2013, Yamaura.
U.S. Appl. No. 13/958,418, filed Aug. 2, 2013, Yamaura.
U.S. Appl. No. 11/790,594, filed Apr. 26, 2007, Yamaura.
U.S. Appl. No. 12/926,613, filed Nov. 30, 2010, Yamaura.
U.S. Appl. No. 13/958,470, filed Aug. 2, 2013, Yamaura.
U.S. Appl. No. 13/958,491, filed Aug. 2, 2013, Yamaura.
U.S. Appl. No. 13/958,501, filed Aug. 2, 2013, Yamaura.
U.S. Appl. No. 13/958,514, filed Aug. 2, 2013, Yamaura.

* cited by examiner

FIG. 4

| OCTET | 1 | 1 | 2 | 1 | 16 | 1 | 4 | 1 |
|---|---|---|---|---|---|---|---|---|
| | ELEMENT ID | LENGTH (25) | HT CAPABILITIES INFO | MAC HT PARAMETERS INFO | SUPPORTED MCS SET | EXTENDED HT CAPABILITY INFO | TxBF CAPABILITIES | AS CAPABILITIES |

FIG. 5

| B0 | B1 | B2 | B3 | B4 | B5 | B6-B7 | B8 | B9 |
|---|---|---|---|---|---|---|---|---|
| TxBF CAPABLE | RECEIVE STAGGERED SOUNDING CAPABLE | TRANSMIT STAGGERED SOUNDING CAPABLE | RECEIVE ZLF CAPABLE | TRANSMIT ZLF CAPABLE | IMPLICIT TxBF CAPABLE | CALIBRATION | EXPLICIT CSI TxBF CAPABLE | EXPLICIT UNCOMPRESSED STEERING MATRIX CAPABLE |

| B10-B12 | B13-B15 | B16-B18 | B19-B20 | B21-B22 | B23-B24 | B25-B31 |
|---|---|---|---|---|---|---|
| EXPLICIT BF CSI FEEDBACK | EXPLICIT UNCOMPRESSED STEERING MATRIX FEEDBACK | EXPLICIT COMPRESSED STEERING MATRIX FEEDBACK | CSI NUMBER OF BEAMFORMER ANTENNAE | UNCOMPRESSED STEERING MATRIX OF BEAMFORMER ANTENNAE | COMPRESSED STEERING MATRIX OF BEAMFORMER ANTENNAE | RESERVED |

WIRELESS COMMUNICATION SYSTEM, WIRELESS COMMUNICATION APPARATUS, AND WIRELESS COMMUNICATION METHOD

CROSS REFERENCES TO RELATED APPLICATIONS

This application is a continuation of and claims the benefit under 35 U.S.C. §120 of U.S. patent application Ser. No. 13/958,501, titled "WIRELESS COMMUNICATION SYSTEM, WIRELESS COMMUNICATION APPARATUS, AND WIRELESS COMMUNICATION METHOD," filed on Aug. 2, 2013, which is a continuation of and claims the benefit under 35 U.S.C. §120 of U.S. patent application Ser. No. 12/926,613, filed on Nov. 30, 2010, which is a continuation of and claims the benefit under 35 U.S.C. §120 of U.S. patent application Ser. No. 11/790,594, filed on Apr. 26, 2007, which claims the benefit under 35 U.S.C. §119 of Japanese Patent Application JP 2007-056243, filed on Mar. 6, 2007, and Japanese Patent Application JP 2006-124537, filed on Apr. 27, 2006. The entire contents of these applications are hereby incorporated by reference in their entireties.

BACKGROUND

1. Technical Field

In one aspect, the invention relates to a wireless communication system, a wireless communication apparatus, and a wireless communication method using spatial multiplexing, and more particularly, to a wireless communication system, a wireless communication apparatus, and a wireless communication method, in which a transmitter and a receiver share channel information to perform closed loop type spatial multiplexing transmission.

In another aspect, the invention relates to a wireless communication system, a wireless communication apparatus, and a wireless communication method, which perform beamforming by obtaining a channel matrix on the basis of training series transmitted from a receiver when a transmitter transmits a packet, and more particularly, to a wireless communication system, a wireless communication apparatus, and a wireless communication method, which perform beamforming using the training series transmitted from the transmitter to the receiver when a number of antennas of the transmitter, which is a beamformer, is smaller than that of the receiver, which is a beamformee.

2. Background Art

Wireless networks have attracted attention recently. A standard of wireless network may be IEEE (Institute of Electrical and Electronics Engineers) 802.11 or IEEE 802.15.

For example, IEEE 802.11a/g, a standard of wireless Local Area Network (LAN), employs an orthogonal frequency division multiplexing (OFDM) modulation method, which is a multi-carrier method. Because, in the OFDM modulation method, transmission data having orthogonal frequencies is distributed to a plurality of carriers and transmitted, the band of each carrier becomes narrow, spectrum efficiency is very high, and resistance to frequency-selective fading interference is strong.

In addition, IEEE 802.11a/g standard supports a modulation method for accomplishing a communication speed up to 54 Mbps. However, a next-generation wireless LAN standard requires a higher bit rate.

In order to realize a higher speed for wireless communications, multi-input multi-output (MIMO) communication has attracted attention. MIMO communication employs a plurality of antennas in a transmitter and in a receiver to realize spatially multiplexed streams. The transmitter performs spatial/temporal encoding and multiplexing of plural pieces of transmission data, and distributes and transmits the plural pieces of transmission data to N transmission antennas through channels, where N is a positive integer. The receiver performs spatial/temporal decoding on signals received by M reception antennas through the channels to obtain reception data without crosstalk between the streams (see, for example, JP-A-2002-44051, hereinafter referred to as Patent Document 1), where M is a positive integer. Ideally, spatial streams are formed corresponding to a fewer number of transmission and reception antennas (i.e. MIN[N, M]).

According to MIMO communication, a transmission capacity can be increased according to the number of antennas, and a communication speed can be improved without increasing frequency bands. Because spatial multiplexing is used, spectrum efficiency is high. MIMO communication uses channel characteristics and is different from a simple transmission/reception adaptive array. For example, in IEEE 802.11n, which is a standard extended from IEEE 802.11a/g, an OFDM_MIMO method using OFDM as the primary modulation is employed. Currently, IEEE 802.11n is standardized in Task Group n (TGn), in which a specification is established based on a specification established in Enhanced Wireless Consortium (EWC) formed in October, 2005.

In MIMO communication, in order to spatially divide a spatially multiplexed reception signal y into stream signals x, a channel matrix H may be acquired by any method and spatially multiplexed reception signal y may be spatially divided into a plurality of original streams using channel matrix H by a predetermined algorithm.

Channel matrix H is obtained by allowing a transmitter/receiver to transmit/receive existing training series, estimating channels by a difference between the actually received signal and the existing series, and arranging propagation channels in a matrix form according to a combination of transmission and reception antennas. When there are N transmission antennas and M reception antennas, the channel matrix is an M×N (row×column) matrix. Accordingly, the transmitter transmits N training series and the receiver acquires channel matrix H using the received training series.

A method for spatially dividing a reception signal is generally classified into an open loop type method, in which a receiver independently performs spatial division on the basis of channel matrix H, and a closed loop type method, in which a transmitter gives weight to transmission antenna on the basis of channel matrix H to perform adequate beamforming toward a receiver to form an ideal spatial orthogonal channel.

For an open loop type MIMO transmission method, there is a zero force (see, for example, A. Benjebbour, H. Murata, and S. Yoshida, "Performance comparison of ordered successive receivers for space-time transmission," Proc. IEEE VTC Fall, vol. 4, pp. 2053-2057, Atlantic City, USA, September 2001, hereinafter referred to as Non-Patent Document 2) or a minimum mean square error (MMSE) (see, for example, "http://radio3.ee.uec.ac.jp/MIMO(IE-ICE_TS).pdf" (Oct. 24, 2003), hereinafter referred to as Non-Patent Document 3). The open loop type MIMO transmission method is a relatively simple algorithm for obtaining reception weight matrix W for spatially dividing the reception signal from channel matrix H, in which a feedback operation for sharing the channel information between the transmitter and the receiver is omitted, and the transmitter and the receiver independently perform spatial multiplexing transmission.

For an ideal closed loop type MIMO transmission method, a singular value decomposition (SVD)-MIMO method using SVD of channel matrix H is known (see, for example A. Benjebbour, H. Murata, and S. Yoshida, "Performance of iterative successive detection algorithm for space-time transmission," Proc. IEEE VTC Spring, vol. 2, pp. 1287-1291, Rhodes, Greece, May 2001, hereinafter referred to as Non-Patent Document 1). In the SVD-MIMO transmission, a numerical matrix having channel information that uses antenna pairs as elements, that is, a channel information matrix H, is subjected to the singular value decomposition to obtain $UDV^H$. A transmitter uses V in a transmission antenna weight matrix, and transmits a beamformed packet to a receiver. A receiver typically uses $(UD)^{-1}$ as a reception antenna weight matrix. Here, D is a diagonal matrix having square roots of singular values $\lambda_i$ corresponding to qualities of the spatial streams in diagonal elements (the subscript "i" indicates the i-th spatial stream). Singular values $\lambda_i$ are the diagonal elements of diagonal matrix D in ascending order. Power ratio distribution or modulation method allocation is performed according to communication quality represented by the level of singular value with respect to the streams, such that a plurality of spatial orthogonal multiplexed propagation channels, which are logically independent, are realized. The receiver can extract a plurality of original signal series without crosstalk, and theoretically accomplish maximum performance.

In the closed loop type MIMO communication system, adequate beamforming is performed when the transmitter transmits a packet, but information on the channel information needs to be fed back from the receiver for receiving the packet.

For example, in EWC HT (High Throughput) MAC (Media Access Control) Specification Version V1.24, two kinds of procedures, namely, "implicit feedback" and "explicit feedback," are defined as the procedure for feeding back the information on the channel matrix between the transmitter and the receiver.

For "implicit feedback," the transmitter estimates a backward channel matrix from the receiver to the transmitter using training series transmitted from the receiver, and a forward channel matrix from the transmitter to the receiver is computed to perform beamforming under the assumption that bi-directional channel characteristics between the transmitter and the receiver are reciprocal. Calibration of an RF circuit in a communication system is performed such that the channel characteristics are reciprocal.

For "explicit feedback," the receiver estimates a forward channel matrix from the transmitter to the receiver using training series transmitted from the transmitter, and returns a packet including the channel matrix as data to the transmitter. The transmitter performs beamforming using the received channel matrix. Alternatively, the receiver computes a transmission weight matrix for allowing the transmitter to perform beamforming from an estimation channel matrix, and returns a packet including the transmission weight matrix as the data to the transmitter. For explicit feedback, the channels may not be assumed to be reciprocal, because the weight matrix is computed on the basis of the estimated forward channel matrix.

In view of packet transmission, the transmitter is an initiator and the receiver is a terminator. However, in view of beamforming, the initiator for transmitting the packet is a beamformer and the terminator for receiving the beamformed packet is a beamformee. Communication from the beamformer to the beamformee is referred to as "forward," and communication from the beamformee to the beamformer is referred to as "backward."

For example, when an access point (AP) transmits a data frame to a client terminal (STA) as the beamformer, explicit feedback requires that the client terminal as the beamformee may only return the training series to the access point for beamforming.

A frame exchange procedure for transmitting the beamforming from the access point to the client terminal by implicit feedback will be described with reference to FIG. 8.

First, the access point requests the client terminal to transmit training series. According to the EWC MAC specification, a link adaptation control field (illustrated in FIG. 10) of an HT control field (illustrated in FIG. 9) of an MAC frame includes a training request bit TRQ. A value of 1 in training request bit TRQ corresponds to a transmission request of the training series.

The client terminal returns a sounding packet. The sounding packet includes the training series corresponding to N transmission antennas of the access point and M reception antennas of the client terminal. The access point can estimate an N×M backward channel matrix when receiving the sounding packet. The access point computes a forward transmission weight matrix for beamforming using the SVD, an Eigen value decomposition (EVD) method, or other matrix decomposition methods, and multiplies transmission signal from the antennas by the transmission weight matrix, such that the beamformed packet can be sent to the client terminal. By beamforming, the client terminal may perform wireless communication at a high transmission rate, even if the client terminal is located at a place where it is difficult to receive the packet in the past.

Subsequently, an operation for allowing the beamformer to perform beamforming using the training series from the beamformee according to implicit feedback will be described with reference to FIG. 11. In FIG. 11, an STA-A having three antennas is a beamformer and an STA-B having two antennas is a beamformee. Hereinafter, a subscript AB indicates forward transmission from STA-A to STA-B and a subscript BA indicates backward transmission from STA-B to STA-A. A numerical subscript corresponds to an antenna number of the corresponding terminal. It is assumed that the channels between STA-A and STA-B are reciprocal. Accordingly, a backward channel matrix $H_{BA}$ becomes a transposed forward channel matrix $H_{AB}$ (i.e. $H_{BA}=H_{AB}^t$).

The training series transmitted from the antennas of STA-B are ($t_{BA1}$, $t_{BA2}$), and the signals received by the antennas of STA-A through a channel $H_{BA}$ are ($r_{BA1}$, $r_{BA2}$, $r_{BA3}$). The following equation (1) is obtained.

$$\begin{pmatrix} r_{BA1} \\ r_{BA2} \\ r_{BA3} \end{pmatrix} = H_{BA} \begin{pmatrix} t_{BA1} \\ t_{BA2} \end{pmatrix} \quad (1)$$

where, channel matrix $H_{BA}$ is a 3×2 matrix expressed by equation (2). Here, $h_{ij}$ is a channel characteristic value of the j-th antenna of STA-B with respect to the i-th antenna of STA-A.

$$H_{BA} = \begin{pmatrix} h_{11} & h_{12} \\ h_{21} & h_{22} \\ h_{31} & h_{32} \end{pmatrix} \quad (2)$$

When channel matrix $H_{BA}$ is subjected to singular value decomposition, equation (3) is obtained. Here, $U_{BA}$ is a matrix having an inherent normalized vector of $H_{BA}H_{BA}^H$, $V_{BA}$ is an inherent normalized vector of $H_{BA}^H H_{BA}$ and $D_{BA}$ is a diagonal matrix having a square root of an inherent vector of $H_{BA}H_{BA}^H$ or $H_{BA}^H H_{BA}$ as diagonal elements. In addition, $U_{BA}$ and $V_{BA}$ are unitary matrices, namely complex conjugate of a transposed matrix becomes the inverse of the matrix.

$$H_{BA} = U_{BA} D_{BA} V_{BA}^H \quad (3)$$

The transmission weight matrix necessary for performing beamforming of the frame transmitted from STA-A to STA-B is matrix $V_{AB}$ obtained by performing the singular value decomposition with respect to forward channel matrix $H_{AB}$. Here, because the channels between STA-A and STA-B are reciprocal and backward channel matrix $H_{BA}$ becomes the transposed matrix of forward channel matrix $H_{AB}$, the singular value decomposition of channel matrix $H_{AB}$ is computed in equation (4).

$$\begin{aligned} H_{AB} &= U_{AB} D_{AB} V_{AB}^H \\ &= V_{BA}^* D_{BA} U_{BA}^T \end{aligned} \quad (4)$$

When the reciprocity of channels is used, a desired transmission weight matrix $V_{AB}$ is expressed by equation (5).

$$\begin{aligned} V_{AB} &= (V_{AB}^H)^H \\ &= (U_{BA}^T)^H \\ &= ((U_{BA}^T)^T)^* \\ &= U_{BA}^* \end{aligned} \quad (5)$$

That is, it is possible to perform beamforming using the complex conjugate of matrix $U_{BA}$ obtained by performing the singular value decomposition with respect to the channel matrix estimated on the basis of the training signal from STA-B.

If the transmission signal of STA-A is x and a reception signal from STA-B is y, reception signal y becomes $H_{AB}x$ (i.e. $y=H_{AB}x$) in a case where the beamforming is not performed (un-steered). If the beamforming are performed by the transmission weight matrix $V_{AB}$ (steered), reception signal y is obtained in equation (6).

$$\begin{aligned} y &= H_{AB} V_{AB} x \\ &= (U_{AB} D_{AB} V_{AB}^H) \cdot V_{AB} x \\ &= U_{AB} D_{AB} x \end{aligned} \quad (6)$$

Accordingly, STA-B can perform spatial division of the original stream by multiplying the reception signals by $D_{AB}^{-1} U_{AB}^H$ as a reception weight.

Subsequently, the explicit feedback will be described. In explicit feedback, the beamformer can receive the explicit feedback of the estimation channel matrix from the beamformee. The format of the feedback of the estimation channel matrix is generally classified into a case where an MIMO channel coefficient is sent, and a case where transmission weight matrix V for beamforming calculated by the beamformee is sent. The format of the former is called channel state information (CSI). In this case, the beamformer needs to compute transmission weight matrix V for beamforming by constructing channel matrix H from the received CSI and by performing the singular value decomposition. The latter is generally classified into a case where transmission weight matrix V for beamforming is sent in an uncompressed format, and a case where transmission weight matrix V for beamforming is sent in a compressed format.

FIG. 12 shows a frame exchange procedure for transmitting beamforming from the access point to the client terminal by explicit feedback.

This procedure is initiated by the access point which sends the sounding packet including a CSI feedback request.

The client terminal estimates the channel matrix based on the sounding packet and collects the CSI. The CSI data is included in the packet as a CSI feedback (CFB) and returned to the access point.

The access point computes the transmission weight matrix for beamforming from the received CFB and multiplies the transmission signal by the transmission weight matrix to transmit the beamformed packet to the client terminal. Even if the access point is located in a place where wireless communication was difficult to achieve in the past, wireless communication can be accomplished at a high transmission rate by beamforming.

According to implicit feedback described above, reduced burden on the beamformee due to the feedback allows the access point (AP) to transmit a data frame to client terminal STA as beamformer. However, in this case, the terminal, which is the beamformer, computes the transmission weight matrix for beamforming by performing the singular value decomposition or other calculation method with respect to the channel matrix estimated from the received training series. This calculation, however, has a heavy processing load, and the processing load increases depending on the increase of the number of streams of the training series transmitted from the beamformee.

In an example shown in FIG. 11, STA-A includes three antennas (N=3), and STA-B includes two antennas (M=2). Because there are more antennas in STA-A than in STA-B, no problem is caused in the processing capability for beamforming. This is because STA-A is designed to include the processing capability corresponding to N of its own streams; the training series of the spatial streams of N or less are divided; an N×M channel matrix is constructed from the divided training series; and the matrix for beamforming is computed based on the N×M channel matrix.

However, for N<M, that is, the number of antennas of the beamformee is larger than that of the beamformer, problems may be caused because the beamformer does not include the processing capability which exceeds the number of its own spatial streams. When STA-A can process only N streams, which is equal to the number of antennas, M stream trainings may not be divided or the matrix for beamforming may not be obtained from the N×M estimation channel matrix.

In order to solve such problems without deteriorating the beamforming characteristics, it may be considered that a channel estimation maximum dimension $M_{max}$ corresponding to a rated maximum number of antennas is given to STA-A as the beamformer (for example, if it is based on the IEEE specification, $M_{max}=4$) and the processing capability for computing the transmission weigh matrix for beamforming is given to the obtained $N \times M_{max}$ estimation channel matrix.

For example, when STA-A includes two antennas (i.e. N=2) and the rated maximum number of antennas is $M_{max}=4$, STA-A can compute only a 2×2 matrix for communication with the terminal having the same number of antennas, but needs to compute a 2×4 matrix. In this case, calculation or processing circuit needs to be doubled, which renders it difficult to reduce the size and the cost of the communication apparatus.

SUMMARY

It is thus desirable to provide a wireless communication system, wireless communication apparatus, and wireless communication method, which are capable of performing communication at a high transmission rate using a beamformed packet by allowing a terminal, which is operated as a beamformer, to divide a spatial stream training transmitted from a terminal, which is operated as a beamformee, to construct an estimation channel matrix from the divided training series, and to suitably obtain a transmission channel matrix for beamforming on the basis of the channel matrix.

It is also desirable to provide a wireless communication system, wireless communication apparatus, and wireless communication method, which are capable of performing beamforming without deteriorating beamforming characteristics, or increasing a processing capability of channel estimation or a computing capability of a matrix for beamforming in the beamformer even when a number of antennas of a terminal, namely a beamformer, is smaller than that of a beamformee.

According to an embodiment consistent with the invention, there is provided a wireless communication system, which performs data transmission from a first terminal including N antennas to a second terminal including M antennas using spatially multiplexed streams (N is an integer of 2 or more and M is an integer of 1 or more). The system includes notifying means for notifying the second terminal of a channel estimation maximum dimension $M_{max}$ of the first terminal; training means for transmitting a packet including training series for exciting a backward channel matrix having N rows, and $M_{max}$ or less columns from the second terminal to the first terminal in correspondence with the channel estimation maximum dimension $M_{max}$ of the first terminal and the number N of antennas of the first terminal; transmission weight matrix computation means for dividing the training series received by the antennas of the first terminal into $M_{max}$ or less streams to prepare the backward channel matrix, thereby obtaining a transmission weight matrix for beamforming at the time of forward data transmission using the backward channel matrix; and beamforming means for performing beamforming in transmission signals from the antennas of the first terminal using the transmission weight matrix for beamforming, when a data packet is transmitted from the first terminal to the second terminal.

The term "system" described herein indicates a logical set of apparatuses, or function modules for realizing specific functions. It is to be understood that the apparatuses or the function modules are not necessarily included in a single casing (the same is true in the below descriptions).

In order to realize high speed wireless communications, there is provided an MIMO communication method which enables wireless communications using spatially multiplexed streams between a transmitter and a receiver, both the transmitter and the receiver including a plurality of antenna elements. In particular, in a closed loop type MIMO communication system, a terminal of a data packet transmission side performs beamforming on the basis of feedback of information on an estimation channel matrix from a terminal of a reception side, such that a plurality of spatially orthogonal multiplexed propagation channels, which are logically independent, are realized. The receiver side can extract a plurality of original signal series without crosstalk, thereby theoretically accomplishing maximum performance.

As a procedure of performing feedback of the channel matrix from the terminal of the reception side to the terminal of the transmission side, for example, two kinds of procedures, that is, "implicit feedback" and "explicit feedback," are defined in the EWC HT MAC specification. Among them, in the implicit feedback, the first terminal, which is operated as a beamformer, divides a spatial stream training transmitted from a second terminal, which is operated, as a beamformee, constructs a backward estimation channel matrix from the divided training series, and performs beamforming of a transmission packet using a transmission channel matrix for beamforming obtained on the basis of the channel matrix to perform communication, by assuming that the bi-directional channel characteristics between the transmitter and the receiver are reciprocal.

For example, when an access point transmits a data frame to a client terminal as the beamformer, according to the implicit feedback, the client terminal as the beamformee only returns the training series to the access point, in order to perform the beamforming.

However, in a case of N<M, that is, the number of antennas of the second terminal is larger than that of the first terminal, because the first terminal which is operated as the beamformer does not include the processing capability which exceeds the number of its own spatial streams, the first terminal may not divide M stream trainings or obtain the matrix for beamforming from the N×M estimation channel matrix.

In the wireless communication system according to an embodiment consistent with the invention, when the beamforming based on the backward channel estimation result is performed according to the implicit feedback, the channel estimation maximum dimension $M_{max}$ of the first terminal is previously notified to the second terminal, and the second terminal transmits the packet including the training series for exciting the $N \times M_{max}$ backward channel matrix in correspondence with the channel estimation maximum dimension $M_{max}$ of the first terminal and the number N of antennas of the first terminal. In other words, the second terminal returns the training series which suppresses the number of streams to be less than or equal to the channel estimation maximum dimension $M_{max}$ of the first terminal. Accordingly, the first terminal divides the spatial stream training of the training series received in a range of processing capability corresponding to the number of its own antennas, and constructs the backward channel matrix from the divided training series, thereby obtaining the transmission weight matrix for beamforming.

For example, when the wireless communication system is based on the EWC HT MAC specification, the first terminal requests the training series through a TRQ bit included in the link adaptation control field of the HT control field of the MAC frame. The second terminal suppresses the number of the streams to be less than or equal to the channel estimation maximum dimension $M_{max}$ of the first terminal, and transmits the sounding packet.

Accordingly, in an embodiment consistent with the invention, when a closed loop type MIMO communication is performed by the implicit feedback, the first terminal, which is operated as the beamformer, can perform channel estimation having a dimension number. The dimension number is suppressed according to the number of its own antenna, and the transmission weight matrix for beamforming is computed with the suppressed dimension number, thereby reducing the circuit size of the first terminal. In more detail, the size of the circuit module for estimating the channel matrix can be reduced to an order of about $(N/M)^2$ and the size of the circuit of the beamforming transmission weight matrix computation means can be reduced to an order of about $(N/M)^2$.

In an embodiment consistent with the invention, the method for notifying the channel estimation maximum dimension $M_{max}$ of the first terminal to the second terminal is not limited. For example, it may be considered that the spatial dimension is specified in the packet for requesting the sounding packet. However, in the defined HT control field, a surplus bit field does not exist. Accordingly, when a bit is newly added to the field, overhead may increase.

Meanwhile, in the EWC specification, it is defined that any HT function supported by a HT terminal is transmitted as the HT capability element and is declared. In the HT capability element, a transmit beamforming (TxBF) capability field for describing the existence of the support of any HT function for beamforming is provided. Accordingly, when the terminal, which is operated as the beamformee, performs the explicit feedback, a capability description field for describing the spatial dimension number of the sounding packet, which can be received from the beamformer, is included.

Accordingly, in an embodiment consistent with the invention, the channel estimation maximum dimension, which can be received from the beamformee in the implicit feedback, is described in the capability description field, regardless of whether the wireless communication apparatus corresponds to the explicit feedback or not.

When the wireless communication apparatus does not correspond to the explicit feedback, the capability description field is generally unused (N/A). When the wireless communication apparatus corresponds to the explicit feedback, the maximum spatial dimension, when the beamformee receives the sounding packet, is described, which is equivalent to the maximum spatial dimension receivable by the beamformer in the implicit feedback.

Accordingly, although, in the explicit feedback, the spatial dimension number of the sounding packet receivable from the beamformer is used as the maximum spatial dimension when receiving the sounding packet, regardless of whether the explicit feedback is supported or not, no problem is caused.

The capability description field is originally used for detecting the channel estimation maximum dimension of the beamformee to which the beamformer transmits the sounding packet in the explicit feedback. Although a method of analyzing the capability description field when performing the implicit feedback is not defined in the standard specification, an equivalent transmission operation can be performed between specific types as proprietary signaling. It is possible to adequately suppress the number of streams of the sounding packet by performing the method of analyzing the capability description field in the reception side of the beamforming when performing the implicit feedback. Although an example of a method for notifying a maximum spatial dimension when receiving the sounding packet using a field, which is already defined in the EWC specification from the first terminal to the second terminal, is described herein, the invention is not limited thereto. For example, the same effect can be obtained by allocating two bits of reserved bits, which exist in the EWC specification, to a bit field indicating the maximum spatial dimension when receiving the sounding packet.

The HT capability element may be included in a predetermined management frame. For example, when the wireless communication apparatus is operated as an access point, the HT capability element may be included in a type of transmission frame such as a beacon signal which is notified in a frame period, a measure pilot for measuring a communication link, an association response and a re-association response which respond to the request of association from the client terminal, or a probe response which responds to the request of basic service set (BSS) information from the client terminal. In addition, when the wireless communication apparatus is operated as the client terminal (or a communication station other than an access point), the HT capability element may be included in a type of transmission frame of an association request and re-association request for requesting network association to the access point, and a probe request for requesting BSS information to the access point.

The notifying means can notify the channel estimation maximum dimension of the beamformer by the implicit feedback, using the existing bit field, without increasing the overhead on the protocol.

According to an embodiment consistent with the invention, there is provided a wireless communication system, a wireless communication apparatus, and a wireless communication method, which are capable of performing communication at a high transmission rate by a beamformed packet. The high transmission rate is achieved by allowing a terminal, which is operated as a beamformer, to divide spatial stream training series transmitted from a terminal, which is operated as a beamformee, to construct an estimation channel matrix from the divided training series, and to suitably obtain a transmission channel matrix for beamforming on the basis of the channel matrix.

According to an embodiment consistent with the invention, there is provided a wireless communication system, a wireless communication apparatus, and a wireless communication method, which are capable of suitably performing beamforming without increasing a processing capability of channel estimation, or a computing capability of a matrix for beamforming in the beamformer, even when the number of antennas of a terminal, which is a beamformer, is smaller than that of a beamformee.

In the wireless communication system, according to an embodiment consistent with the invention, when the beamforming is performed on the basis of a backward channel estimation result by the implicit feedback, and the number of antennas of a terminal of a transmitter side is smaller than that of a terminal of a receiver side, estimation of a channel, in which the dimension is suppressed, and computation of a transmission weight matrix for beamforming, in which the dimension is suppressed, are possible by previously notifying the terminal at the transmitter side with a channel estimation maximum dimension, and thus the circuit size of the terminal of the transmitter side can be reduced.

Other objects, features, and advantages consistent with the invention will become apparent and more readily appre-

BRIEF DESCRIPTION OF THE DRAWINGS

FIG. 4 shows a format of a HT capability element defined in IEEE 802.11n standard.

FIG. 5 shows a format of a Tx beamforming capability field included in the HT capability element.

DETAILED DESCRIPTION

Hereinafter, embodiments consistent with the invention will be described in detail with reference to the accompanying drawings.

A wireless communication system of one embodiment performs closed loop type MIMO communication. In particular, a terminal at a transmitter side performs beamforming by performing feedback for a channel matrix, such as the "implicit feedback" defined in the EWC HT MAC specification.

For implicit feedback, a terminal operated as a beamformer divides a spatial stream training transmitted from a terminal operated as a beamformee, constructs a backward estimation channel matrix from the divided training series, and performs beamforming of a transmission packet using a transmission channel matrix for beamforming obtained on the basis of the channel matrix, thereby performing communication.

However, a processing capability for performing channel estimation or a processing capability for computing a matrix for beamforming of a terminal is determined according to the number of antennas of the terminal. Accordingly, if the number of antennas of the beamformee is large, transmitted spatial stream training exceeds a channel estimation maximum dimension allowed by the terminal. As a result, the spatial stream training may not be divided or a matrix for beamforming may not be computed from a channel matrix of a higher dimension.

In contrast, in the wireless communication system according to the embodiment, the beamformee is pre-notified of the channel estimation maximum dimension of the beamformer. Accordingly, when the beamformee receives a transmission request of training series from the beamformer, the number of streams at the time of transmitting the training series is suppressed to an antenna estimation maximum dimension. Thus, the beamformer divides the spatial stream training of the training series received in a range of its own processing capability, constructs a backward channel matrix from the divided training series, and extracts a transmission weight matrix for beamforming.

Figure 1:
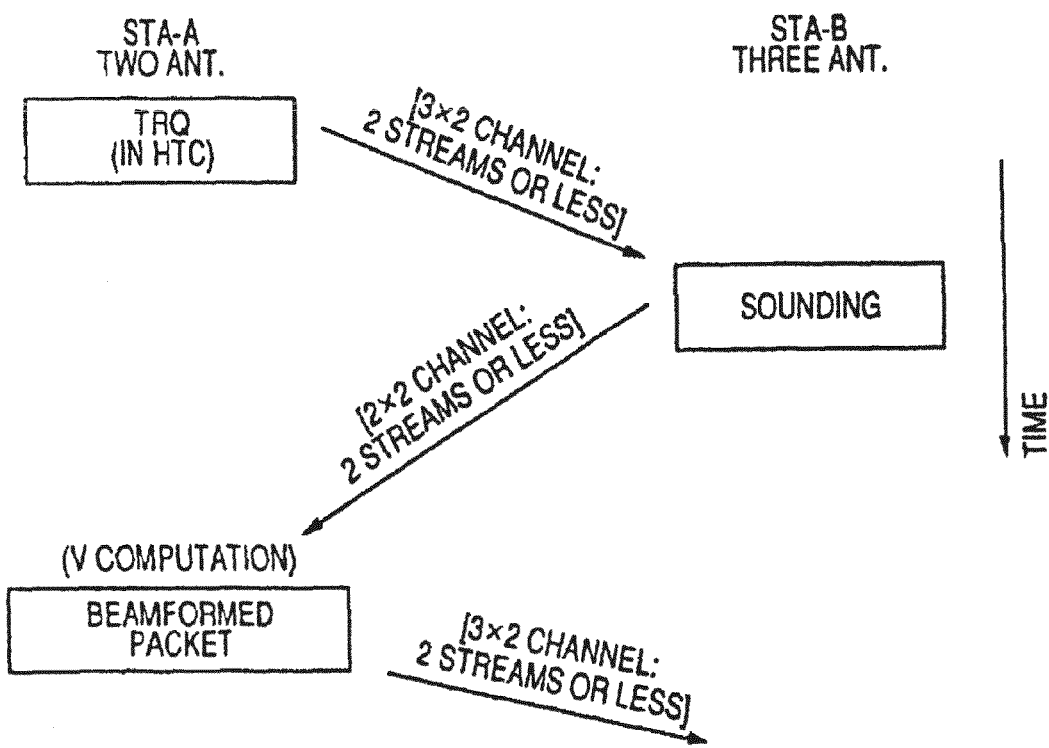
FIG. 1 is a schematic diagram of an operation procedure of implicit feedback, according to an embodiment.

FIG. 1 schematically illustrates an operation procedure of the implicit feedback according to the embodiment. Here, the number of antennas of an STA-A as the beamformer or a channel estimation maximum dimension is two, and the number of antennas of an STA-B as the beamformee is three. The procedure is performed on the basis of the EWC MAC specification.

First, STA-A requests STA-B to transmit training series. A request packet uses a 3×2 channel. In a transmission capability of STA-A and a reception capability of STA-B, the number of spatial streams used by the transmission capability of STA-A is restricted to one or two spatial streams.

STA-B returns a sounding packet including the training series in response to the request packet. When this packet is transmitted, the number of spatial streams is suppressed to the channel estimation maximum dimension of STA-A and a 2×2 backward channel is excited. Accordingly, when STA-A receives the sounding packet, STA-A can generate a 2×2 backward estimation channel matrix. In such a case, STA-A can perform the channel estimation and the computation of the transmission weight matrix for beamforming in the range of the assumed processing capability and the size of the circuit of the terminal can be reduced.

Thereafter, the request of sounding packet, the channel estimation, and the computation of transmission weight matrix for beamforming due to the reception of sounding packet are repeatedly performed whenever STA-A performs the beamforming.

Hereinafter, a wireless communication system according to an embodiment consistent with the invention will be described in detail.

Figure 2:
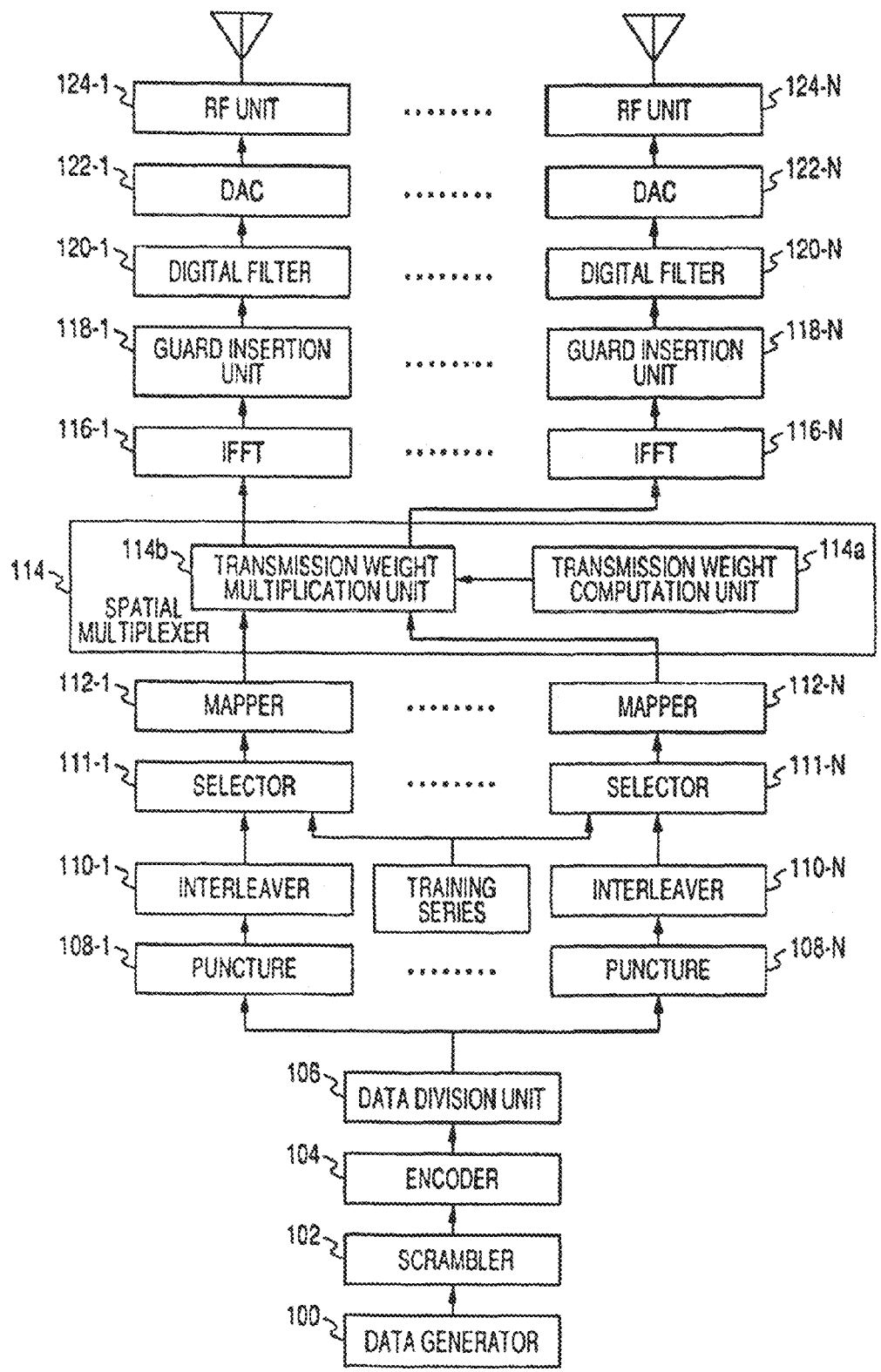
FIG. 2 schematically illustrates a transmitter of a wireless communication apparatus which can be an STA-A (or STA-B) of FIG. 1.
Figure 3:
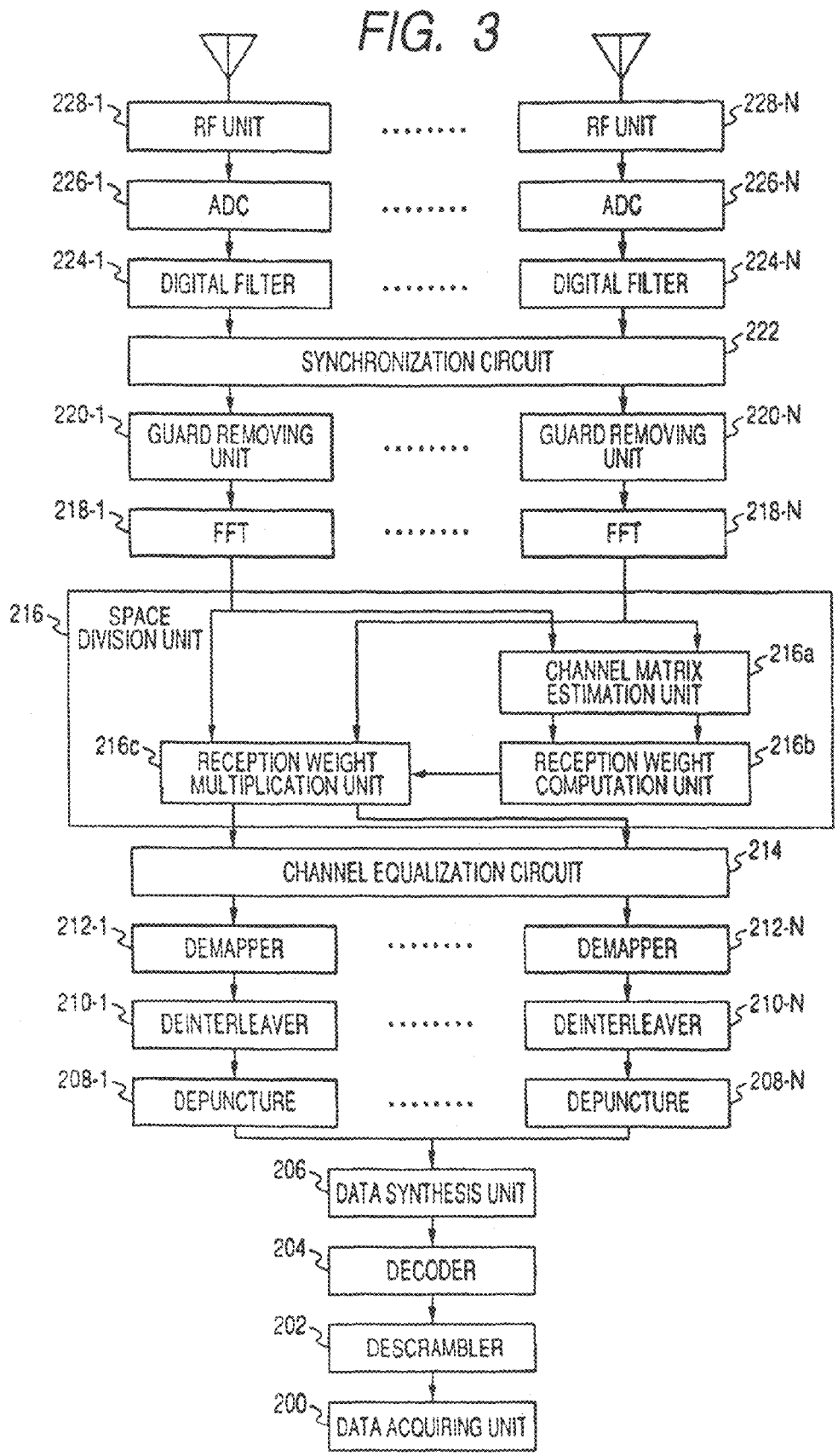
FIG. 3 schematically illustrates a receiver of the wireless communication apparatus which can be the STA-A (or STA-B) of FIG. 1.

FIGS. 2 and 3 schematically illustrate a transmitter and a receiver of a wireless communication apparatus. The transmitter and the receiver may be operated as STA-A and STA-B of the wireless communication system shown in FIG. 1, respectively. STA-A may include N antennas. In one example, N is four or less, according to IEEE specification. However, only two antennas are shown in the FIGS. 2 and 3 in order to avoid conflict of illustration.

Transmission data supplied from a data generator 100 is scrambled by a scrambler 102. Subsequently, error correction encoding is performed by an encoder 104. For example, in the EWC HT PHY specification, scrambling and encoding methods are defined according to the definition of IEEE 802.11a. The encoded signal is input to a data division unit 106 to be divided into transmission streams.

In each transmission stream, a transmission signal is punctured by a puncture 108 according to a data rate applied to each stream, interleaved by an interleaver 110, mapped to an IQ signal space by a mapper 112, thereby becoming a conjugate baseband signal. A selector 111 inserts the training series into the transmission signal of each interleaved spatial stream at an adequate timing and supplies it to mapper 112. In the EWC HT PHY specification, an interleaving scheme expands the definition of IEEE 802.11a, such that the same interleaving is not performed among a plurality of streams. For mapping scheme, BPSK, QPSK, 16QAM, or 64QAM is applied according to IEEE 802.11a.

When beamforming is performed with respect to the transmission signal, in a spatial multiplexer 114, a beamforming transmission weight matrix computation unit 114a calculates transmission weight matrix V for beamforming from channel matrix H using a computation method such as the singular value decomposition. A transmission weight matrix multiplication unit 114b multiplies the transmission vector having the transmission streams as its elements by transmission weight matrix V, thereby performing the beamforming. When transmitting the sounding packet, the beamforming is not performed with respect to the transmission signal. The beamforming transmission weight matrix computation unit 114a computes the transmission weight matrix by equations (3) to (5) using the backward channel matrix constructed by allowing a channel matrix estimation unit 216a (described below with reference to FIG. 3) of the receiver to divide the spatial stream training transmitted from the beamformee.

An inverse fast Fourier transform unit (IFFT) 116 converts the subcarriers arranged in a frequency region into a time axis signal. A guard insertion unit 118 adds a guard interval. A digital filter 120 performs band limitation, a Digital-Analog converter (DAC) 122 converts the band-limited signal into an analog signal, and an RF unit 124 up-converts the analog signal to an adequate frequency band and transmits the converted signal to the channel through a transmission antenna. In implicit feedback, assuming that the channel characteristics are reciprocal, RF unit 124 performs calibration.

Meanwhile, the data that reaches the receiver (shown in FIG. 3) through the channel is analog-processed in an RF unit 228, converted into a digital signal by an Analog-Digital converter (ADC) 226, and input to a digital filter 224, in each reception antenna branch. In implicit feedback, assuming that the channel characteristics are reciprocal, RF unit 228 performs calibration.

Subsequently, a synchronization circuit 222 performs processes including packet detection, timing detection, and frequency offset correction. A guard removing unit 220 removes the guard interval added to the top of data transmission section. A fast Fourier transform unit (FFT) 218 transforms a time domain signal into a frequency domain signal.

A space division unit 216 performs a space division process of the spatially multiplexed reception signal. In particular, a channel matrix estimation unit 216a divides the spatial stream training included in the PHY header of the sounding packet and constructs an estimation channel matrix H from the training series. In implicit feedback, when the apparatus operates as a beamformer, estimation channel matrix H obtained by channel matrix estimation unit 216a is sent to beamforming transmission weight matrix computation unit 114a of the transmitter as a backward channel matrix. In the implicit feedback procedure, when the apparatus operates as a beamformee, an antenna reception weight matrix computation unit 216b computes an antenna reception weight matrix W on the basis of channel matrix H obtained by channel matrix estimation unit 216a. In a case that beamforming is performed with respect to the reception packet and that the estimation channel matrix is subjected to the singular value decomposition, the estimation channel matrix becomes UD (see Equation (6)), and antenna reception weight W is calculated therefrom. Although antenna reception weight W is calculated using the singular value decomposition, it is appreciated that other calculation methods, such as zero forcing or MMSE, may be used. An antenna reception weight matrix multiplication unit 216c multiplies the reception vector having the reception streams as its elements by antenna reception weight matrix W to perform spatial decoding of the spatial multiplexed signal, thereby obtaining independent signal series for each stream.

A channel equalization circuit 214 performs remaining frequency offset correction and channel tracking with respect to the signal series of each stream. A demapper 212 demaps the reception signal on the IQ signal space, a deinterleaver 210 performs deinterleaving, and a depuncture 208 performs depuncturing at a predetermined data rate.

A data synthesis unit 206 synthesizes a plurality of reception streams to one stream. This data synthesis process performs an operation opposed to the data division performed in the transmitter. A decoder 204 performs error correction decoding, a descrambler 202 performs descrambling, and a data acquiring unit 200 acquires the reception data.

When the wireless communication apparatus operates as a data transmission terminal, that is, the beamformer, in the closed loop type MIMO communication, the beamformer pre-notifies the beamformee of channel estimation maximum dimension $M_{max}$, that is, the maximum spatial dimension of the sounding packet that can be received by the beamformee. Generally, channel estimation maximum dimension $M_{max}$ is equal to the number N of antennas of the wireless communication apparatus as the beamformer (the channel estimation maximum dimension is one of the capability of the wireless communication apparatus, and a procedure of notifying of the channel estimation maximum dimension will be described later). When beamforming is performed to start the transmission of data packet or when the transmission weight matrix for beamforming is desired to be updated, a training request TRQ is issued to the beamformee.

When the wireless communication apparatus operates as a beamformee, the sounding packet for exciting the wireless propagation channel is transmitted in response to the reception of training request. Here, when the pre-notified channel estimation maximum dimension N of the beamformer is smaller than the number M of antennas of the beamformee, the beamformee restricts the spatial dimension of sounding packet to channel estimation maximum dimension $M_{max}$ of the beamformer.

When the beamformer receives the sounding packet, the beamformer divides the spatial stream training transmitted from the beamformee and constructs the backward estimation channel matrix from the divided training series. Even when the number M of antennas of the beamformee is larger than the number N of antennas of the beamformer, the spatial dimension of sounding packet is restricted to channel estimation maximum dimension N (=$M_{max}$) of the beamformer. The beamformer estimates an N×N channel matrix as a maximum, and N×N transmission weight matrix for beamforming is computed from the N×N maximum estimation channel matrix using a computation method, such as the singular value decomposition.

Accordingly, when the wireless communication apparatus is configured to be a beamformer, the circuit size of channel matrix estimation unit 216a can be reduced to the order of about $(N/M)^2$. Comparing with the case where the N×N transmission weight matrix for beamforming is computed from the N×M maximum channel matrix estimation result, the circuit size of beamforming transmission weight matrix computation unit 216b can be reduced to the order of about $(N/M)^2$. Because the circuit configuration related to spatial division and spatial multiplexing is complicated, the spatial dimension of sounding packet is restricted, so as to accomplish miniaturization, low cost, and low power consumption of the wireless communication apparatus.

In order to perform the above-described beamforming procedure, the beamformee needs be pre-notified of channel estimation maximum dimension $M_{max}$. Hereinafter, a method for notifying the channel estimation maximum dimension according to the EWC specification will be described.

Figure 9:
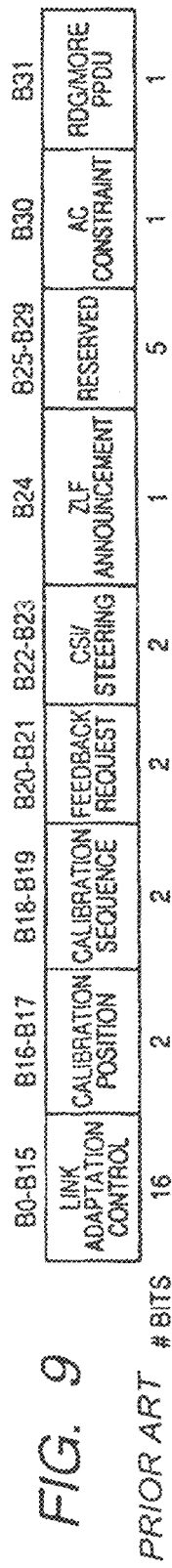
FIG. 9 schematically illustrates a format of a HT control field of an MAC frame defined in IEEE 802.11 standard.
Figure 10:
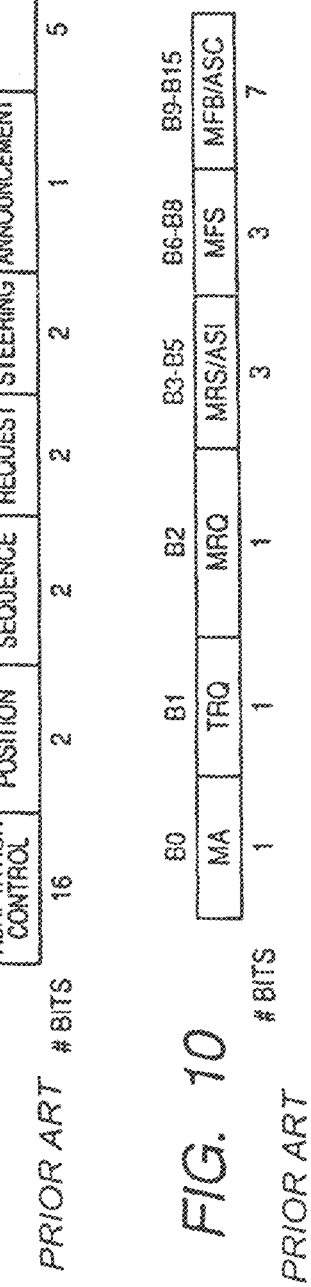
FIG. 10 schematically illustrates a format of a link adaptation control field in the HT control field shown in FIG. 9.
Figure 11:
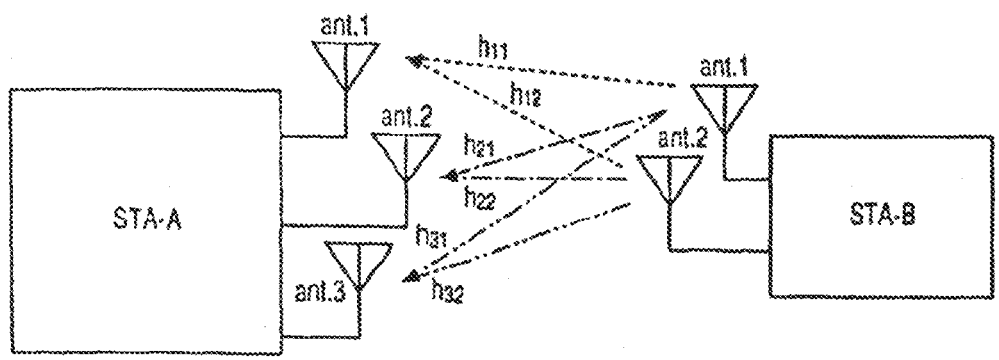
FIG. 11 schematically illustrates a calculation process for allowing the beamformer to perform the beamforming using training series from the beamformee according to the implicit feedback.
Figure 12:
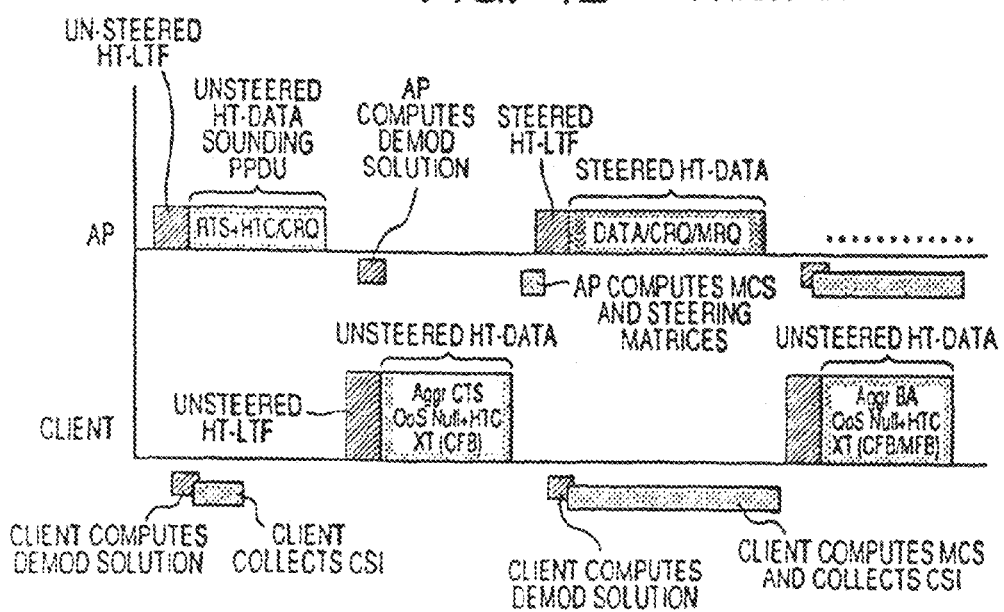
FIG. 12 schematically illustrates a frame exchange procedure for transmitting beamforming from an access point to a client terminal by explicit feedback.

For example, when a beamformer requests that the sounding packet including the training series be transmitted, a method for notifying channel estimation maximum dimension $M_{max}$ may be used. However, the request of training series is performed using only the training request (TRQ) included in the link adaptation control field (shown in FIG. 10) in the HT control field (shown in FIG. 9) of the MAC frame. An additional field which can be used in the description of the channel estimation maximum dimension does not exist. New definition of the frame format including the description field of channel estimation maximum dimension is not realized in a standardized operation, and is not efficient because adding a new bit field increases communication overhead.

In implicit feedback, the beamformee only returns the sounding packet including the training series according to the beamformer's request. However, in explicit feedback, the beamformee performs the channel estimation. Although the beamformer for requesting the explicit feedback transmits the sounding packet with the number of spatial streams exceeding the channel estimation maximum dimension of the beamformer, the beamformee does not divide the sounding packet, and does not construct the channel matrix nor compute the transmission weight matrix. Thus, the feedback is inadequate.

Accordingly, in the EWC specification, when explicit feedback is applied, a method for notifying information of the channel estimation maximum dimension is determined as one of the capability of beamformee.

Accordingly, the beamformee can be notified of the spatial dimension of sounding packet received when operating the beamformer in implicit feedback, using the method for notifying the capability of beamformee, regardless of whether the wireless communication apparatus corresponds to explicit feedback or not. Hereinafter, the notifying method will be described.

In the EWC specification, interconnection with IEEE 802.11a/b/g is maintained, but it is defined that a terminal, which transmits the HT capability element in high-speed, is declared to be the HT terminal. The HT terminal may include the HT capability element in a predetermined management frame, and declare any element of the HT functions by the HT capability element.

For example, any HT function determines whether the wireless communication apparatus supports only implicit feedback, or both implicit feedback and explicit feedback, with respect to beamforming. In general, there are three kinds of explicit feedback, which includes the CSI, uncompressed, and compressed (described above), but an HT function will determine which format is supported.

FIG. 4 shows a format of HT capability element. As shown, in a transmit beamforming (TxBF) capability field, an HT function for beamforming is specified. FIG. 5 shows the configuration of the Tx beamforming capability field.

The Tx beamforming capability field has 32 bits. Among them, the $19^{th}$ to the $20^{th}$ bits are allocated to the CSI number of beamformer antennas, the $21^{st}$ to the $22^{nd}$ bits are allocated to the uncompressed steering matrix of beamformer antennas, and the $23^{rd}$ to the $24^{th}$ bits are allocated to the compressed steering matrix of beamformer antennas. In these fields, the spatial dimension number of sounding packet receivable from the beamformer when the beamformee performs explicit feedback with each format is described.

In the present embodiment, channel estimation maximum dimension $M_{max}$ receivable by the beamformer from the beamformee in implicit feedback is described in at least one field, regardless of whether the wireless communication apparatus corresponds to explicit feedback or not.

When the wireless communication apparatus does not correspond to explicit feedback, the $19^{th}$ to the $24^{th}$ bit fields of TxBF capability field is generally unused (N/A). When the wireless communication apparatus corresponds to explicit feedback, a maximum spatial dimension for the beamformee to receive the sounding packet is described, which is equivalent to a maximum spatial dimension receivable by the beamformer in implicit feedback.

Accordingly, regardless of whether explicit feedback is supported or not, there is no problem to use the spatial dimension number of sounding packet, which is described in the $19^{th}$ to the $24^{th}$ bit fields of the TxBF capability field in the explicit feedback and received from the beamformer, as the maximum spatial dimension when the sounding packet is received.

Figure 13:
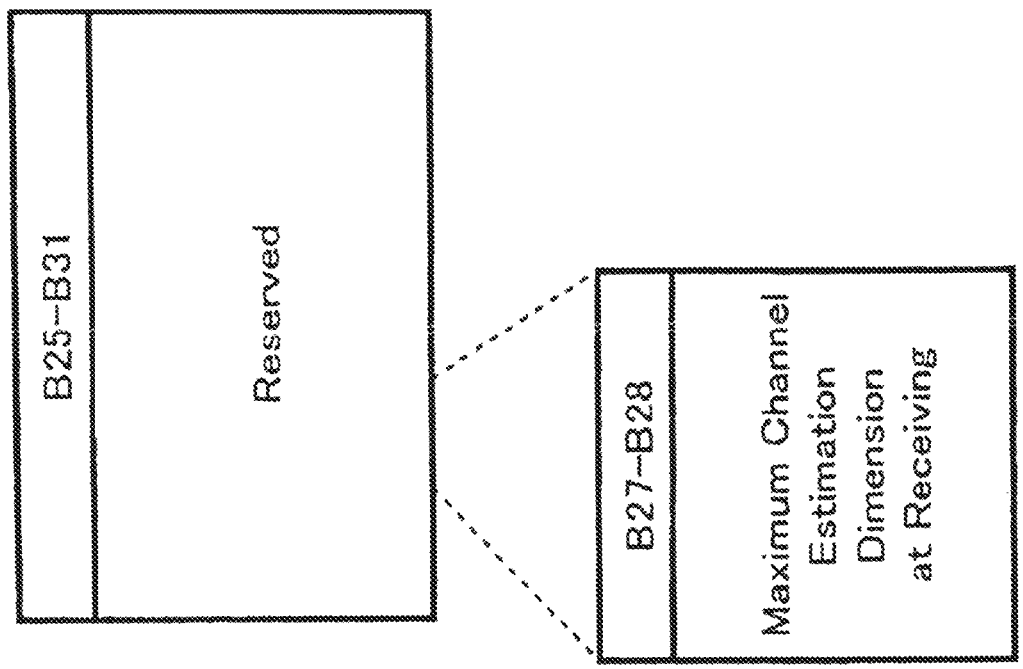
FIG. 13 schematically illustrates an aspect of using two bits of B27 to B28 of a Tx beamforming capability field as a "maximum channel estimation dimension at receiving" field.

The $19^{th}$ to the $24^{th}$ bit fields of the TxBF capability field are originally used for detecting the channel estimation maximum dimension of beamformee to which the beamformer transmits the sounding packet in explicit feedback. Although a method for analyzing the bit field is not defined in a standardized specification when performing implicit feedback, an equivalent transmission operation can be performed between specific types as proprietary signaling. It is possible to adequately suppress the number of streams of the sounding packet by performing the method for analyzing the bit field in the reception side of the beamforming when performing implicit feedback. Although an example of a method for notifying a maximum spatial dimension when receiving the sounding packet using a field, which is already defined in the EWC specification from a first terminal to a second terminal, is described herein, the invention is not limited thereto. For example, the same effect can be obtained by allocating two reserved bits, which exist in the EWC specification, to a bit field indicating the maximum spatial dimension when receiving the sounding packet. As an additional defining method, for example, information of the maximum spatial dimension when receiving the sounding packet is described using a partial bit field of B25 to B31, which is a "reserved" area in the current Tx beamforming capability field. In particular, two bits of B27 to B28 is used as "maximum channel estimation dimension at receiving" field (see FIG. 13). A matrix having one row and N columns is defined as a maximum, if the value thereof is zero; a matrix having two rows and N columns is defined as a maximum, if the value thereof is one; a matrix having three rows and N columns is defined as a maximum, if the value thereof is two; and a matrix having four rows and N columns is defined as a maximum, if the value thereof is three, thereby representing the spatial dimension allowed when receiving the sounding packet. Here, the channel matrix is based on a direction from the first terminal to the second terminal. A matrix at a time point when the channel is estimated in the first terminal is represented by a matrix having N rows and one column, a matrix having N rows and two columns, a matrix having N rows and three columns, and a matrix having N rows and four columns as a maximum.

The HT capability element may be included in a predetermined management frame. For example, when STA-A operates as the access point, the HT capability element may be included in a type of transmission frame of a beacon signal, which is notified in a frame period, a measure pilot for measuring a communication link, both an association response and a re-association response, which respond to the request of association from the client terminal, or a probe response, which responds to the request of Basic Service Set (BSS) information from the client terminal such that the dimension of CSI information is notified to STA-B, which participates in the network operated by STA-A. In addition, when STA-A operates as a client terminal (or a communication station other than the access point), the HT capability element may be included in a type of transmission frame of an association request and re-association request for requesting network association to STA-B, which operates as the access point and a probe request for requesting BSS information to the access point. Accordingly, even when the wireless communication apparatus operates as any one of the access point and the client terminal, the wireless communication apparatus can be notified of the channel estimation maximum dimension of beamformer by implicit feedback by transmitting the HT capability element.

By using the existing bit field, it is possible to notify the channel estimation maximum dimension of beamformer by implicit feedback, without increasing the overhead of the protocol.

Figure 6:
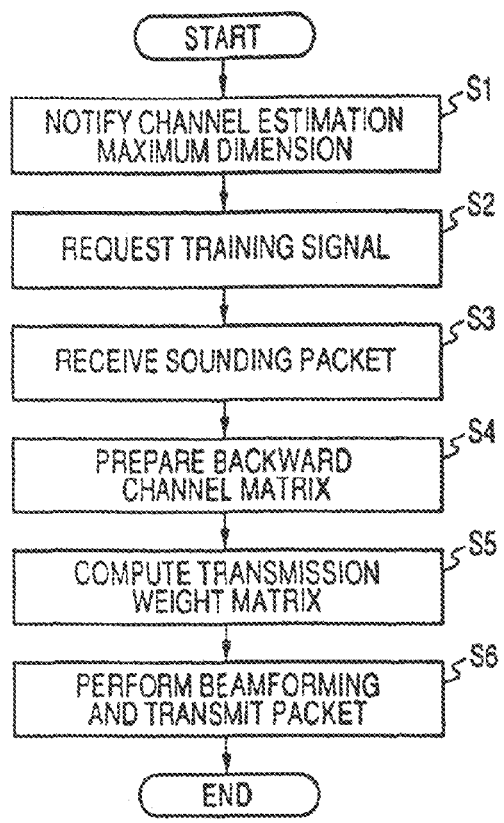
FIG. 6 is a flowchart illustrating a process when the wireless communication apparatuses shown in FIGS. 2 and 3 operate as a beamformer on the basis of the implicit feedback.

FIG. 6 is a flowchart illustrating a process when wireless communication apparatuses shown in FIGS. 2 and 3 operate as an initiator, that is, a beamformer, on the basis of implicit feedback.

First, the apparatus notifies a receiver of channel estimation maximum dimension $M_{max}$ (step S1). In one example, when the wireless communication apparatus operates as an access point, the HT capability element is included in the beacon signal. In another example, when the wireless communication apparatus operates as a client terminal, the HT capability element is included in the message for the network association for the access point. This notification does not require immediacy, and thus does not need to be repeated whenever the transmission using the beamforming is performed.

Next, the apparatus transmits a request for the training signal to the receiver which operates as a beamformee (step S2). In more detail, a TRQ bit included in the link adaptation control field of the HT control field of the MAC frame is placed.

Then, the apparatus receives the sounding packet transmitted from the receiver in response to the request (step S3). The sounding packet includes the training series for exciting an N×$M_{max}$ backward channel matrix in correspondence with channel estimation maximum dimension $M_{max}$ and N antennas. In other words, the number of streams of the sounding packet is suppressed to the channel estimation maximum dimension.

Next, the training series received by the antennas are divided into $M_{max}$ streams to prepare the backward channel matrix (step S9) and the transmission weight matrix for beamforming upon obtaining the forward data transmission using the backward channel matrix (step S5).

The beamforming is performed in a transmission vector having the transmission signals from the antennas as its element using the transmission weight matrix for beamforming, and the data packet is transmitted to the receiver (step S6). It is possible to make an ideal spatially orthogonal channel by weighting the transmission antennas on the basis of the channel matrix and performing the adequate beamforming directed to the receiver.

Figure 7:
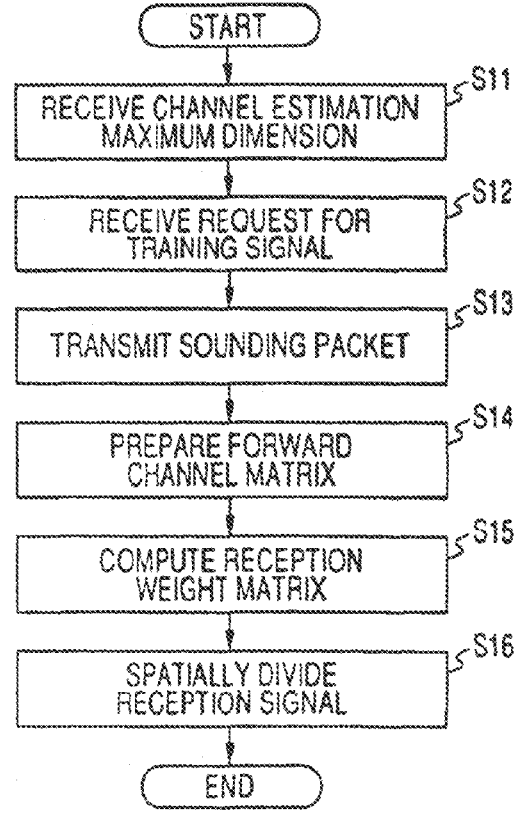
FIG. 7 is a flowchart illustrating a process when the wireless communication apparatuses shown in FIGS. 2 and 3 operate as a beamformee on the basis of the implicit feedback.
Figure 8:
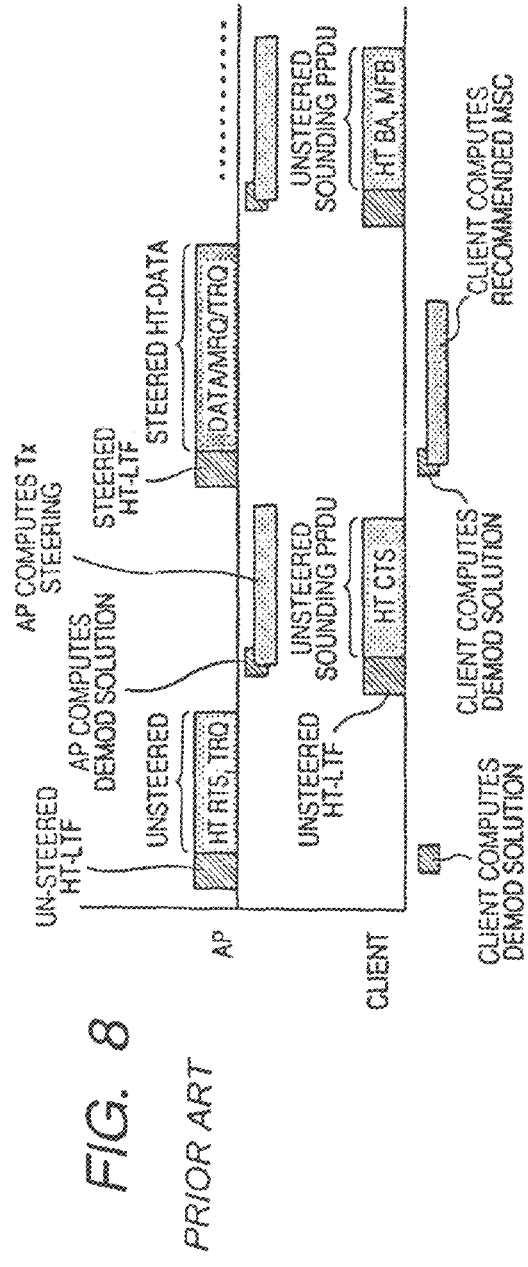
FIG. 8 schematically illustrates a frame exchange procedure for transmitting beamforming from an access point to a client terminal by the implicit feedback.

FIG. 7 is a flowchart illustrating a process when the wireless communication apparatuses shown in FIGS. 2 and 3 operate as a receiver, that is, a beamformer, on the basis of implicit feedback.

First, the apparatus receives channel estimation maximum dimension $M_{max}$ of the initiator (step S11). When the initiator operates as an access point, the HT capability element is included in the beacon signal. When the initiator newly participates in a network as a client terminal in which the apparatus operates as the access point, the HT capability element is included in the message for network association.

Next, the apparatus receives the request for the training signal from the initiator which operates as a beamformer (step S12). In more detail, the TRQ bit included in the link adaptation control field of the HT control field of the MAC frame received from the initiator is placed.

Then, the apparatus returns the sounding packet to the initiator in response to the request (step S13). The sounding packet includes the training series for exciting the N×$M_{max}$ backward channel matrix in correspondence with channel estimation maximum dimension $M_{max}$ and N antennas. In other words, the number of streams of the sounding packet is suppressed to the channel estimation maximum dimension.

The initiator divides the training series received by the N antennas into the $M_{max}$ streams to prepare the backward channel matrix, and obtains the transmission weight matrix for beamforming at the time of the forward data transmission using the backward channel matrix. Beamforming is performed in the transmission vector having the transmission signals from the N antennas as its elements using the transmission weight matrix for beamforming, and the data packet is transmitted to the receiver.

The wireless communication apparatus operated as a beamformee divides the spatial stream training received from the initiator, constructs the forward estimation channel matrix (step S14), and obtains the reception weight matrix from the channel matrix (step S15). A method of computing the reception weight matrix, a ZF method, or an MMSE method may be used. Alternatively, $D^{-1}U^H$ computed from matrices U and D obtained by performing the singular value decomposition with respect to the channel estimation matrix may also be used.

When the N antennas receive the data packet from the initiator, the reception vector composed of reception signals for the payload part is multiplied with the reception weight matrix to perform spatial decoding of the spatial multiplexing signal. The signal series, which are independent in each stream, are obtained (step S16). By beamforming, communication can be performed at a high transmission rate even if the communication apparatus is located in a place where the packet was difficult to receive in the past.

Although the invention has been described in detail with reference to specific embodiments, it is apparent to those skilled in the art that these embodiments may be modified or substituted without departing from the scope consistent with the invention.

Although an embodiment consistent with the invention has been described as being related to the MIMO communication system according to the EWC specification set forth in IEEE 802.11n, the scope of the invention is not limited thereto. Because the MIMO communication system uses spatially multiplexed streams transmitted from a first terminal including N antennas to a second terminal including M antennas, it is possible to apply the invention to various types of communication systems, in which a beamformer performs beamforming using a training signal transmitted from a beamformee.

Although, for simplicity, a transmission terminal is described in one embodiment to perform "direct mapping" for directly mapping the streams to the antenna branches, the invention is applicable to employ "spatial expansion" or a conversion method, in which the streams do not have a one-to-one correspondence with the antenna branches.

Although an embodiment applicable to IEEE 802.11n standard, which is extended from IEEE 802.11, is described in the present specification, the invention is not limited thereto. The invention is applicable to a variety of wireless communication systems using an MIMO communication method, such as a mobile WiMax (Worldwide Interoperability for Microwave) based on IEEE 802.16e standard, a high-speed wireless communication for mobile objects based on IEEE 802.20 standard, a high-speed wireless PAN (Personal Area Network) using 60 GHz (milliwave) band based on IEEE 802.15.3c standard, a wireless HD (High Definition) which transmits an uncompressed HD image using wireless transmission of 60 GHz (milliwave) band, and a fourth generation (4G) mobile telephone.

It should be understood by those skilled in the art that various modifications, combinations, sub-combinations, and alterations may occur depending on design requirements and other factors. All of such modifications, combinations, sub-combinations, and alterations are considered within the scope of the appended claims or the equivalents thereof.

What is claimed is:

1. An electronic device for wireless communication, the electronic device comprising:
   transmitter circuitry configured to:
      notify another electronic device of a beamformee capability including a maximum number of space time streams, the beamformee capability being included in a first section of a capabilities information field defined as a 32-bit field according to a wireless network standard; and
      transmit signals to the other electronic device based at least in part on information included in the capabilities information field, so as to establish a wireless communication channel, wherein a beamformer capability is included in a second section of the capabilities information field adjacent to the first section,
   wherein the electronic device transmits the beamformee capability and the beamformer capability in the adjacent first and second sections of the capabilities information field according to the wireless network standard,
   wherein the beamformer capability and the beamformee capability are expressed by a same number of bits, the number of bits being more than one, and
   wherein both the beamformer capability and the beamformee capability are for compressed beamforming;

a plurality of antennas configured to transmit or receive signals including the beamformee capability; and
a digital filter unit configured to perform band limitation, a number of the filtering of the digital filter unit being equal to a number of the plurality of antennas.

2. The electronic device of claim 1, wherein the capabilities information field is present in a management frame.

3. The electronic device of claim 2, wherein the management frame includes a beacon signal, a measure pilot, an association response, a re-association response, and/or a probe response.

4. The electronic device of claim 1, wherein the maximum number of space time streams indicates a number of rows or columns of a MIMO (multiple-input multiple-output) channel matrix for the wireless communication.

5. The electronic device of claim 4, wherein a channel state information is estimated as a channel state information matrix, a number of columns of the channel state information matrix being equal to or less than the number of columns of the MIMO channel matrix.

6. The electronic device of claim 1, wherein the capability information field further includes both implicit beamforming capability information and explicit beamforming capability information.

7. The electronic device of claim 1, wherein a number of the plurality of antennas is two or three.

8. A method for wireless communication, the method comprising:
   notifying, by an electronic device, another electronic device of a beamformee capability including a maximum number of space time streams, the beamformee capability being included in a first section of a capabilities information field defined as a 32-bit field according to a wireless network standard; and
   transmitting signals, by the electronic device, to the other electronic device based at least in part on information included in the capabilities information field, so as to establish a wireless communication channel, wherein a beamformer capability is included in a second section of the capabilities information field adjacent to the first section,
   wherein notifying the other electronic device comprises transmitting the beamformee capability and the beamformer capability to the electronic device in the adjacent first and second sections of the capabilities information field according to the wireless network standard,
   wherein the beamformer capability and the beamformee capability are expressed by a same number of bits, the number of bits being more than one,
   wherein both the beamformer capability and the beamformee capability are for compressed beamforming, and
   wherein the electronic device includes a plurality of antennas configured to transmit or receive signals including the beamformee capability; and a digital filter unit configured to perform band limitation, a number of the filtering of the digital filter unit being equal to a number of the plurality of antennas.

9. The method of claim 8, wherein the capabilities information field is present in a management frame.

10. The method of claim 9, wherein the management frame includes a beacon signal, a measure pilot, an association response, a re-association response, and/or a probe response.

11. The method of claim 8, wherein the maximum number of space time streams indicates a number of rows or columns of a MIMO (multiple-input multiple-output) channel matrix for the wireless communication.

12. The method of claim 11, wherein a channel state information is estimated as a channel state information matrix, a number of columns of the channel state information matrix being equal to or less than the number of columns of the MIMO channel matrix.

13. The method of claim 8, wherein the capability information field further includes both implicit beamforming capability information and explicit beamforming capability information.

14. An electronic device for wireless communication, the electronic device comprising:
receiver circuitry configured to:
receive a beamformee capability including a maximum number of space time streams, the beamformee capability being included in a first section of a capabilities information field defined as a 32-bit field according to a wireless network standard; and
receive signals based at least in part on information included in the capabilities information field, so as to establish a wireless communication channel, wherein a beamformer capability is included in a second section of the capabilities information field adjacent to the first section,
wherein the electronic device receives the beamformee capability and the beamformer capability in the adjacent first and second sections of the capabilities information field according to the wireless network standard,
wherein the beamformer capability and the beamformee capability are expressed by a same number of bits, the number of bits being more than one, and
wherein both the beamformer capability and the beamformee capability are for compressed beamforming;
a plurality of antennas configured to transmit or receive signals including the beamformee capability; and
a digital filter unit configured to perform band limitation, a number of the filtering of the digital filter unit being equal to a number of the plurality of antennas.

15. The electronic device of claim 14, wherein the capabilities information field is present in a management frame.

16. The electronic device of claim 15, wherein the management frame includes a beacon signal, a measure pilot, an association response, a re-association response, and/or a probe response.

17. The electronic device of claim 14, wherein the maximum number of space time streams indicates a number of rows or columns of a MIMO (multiple-input multiple-output) channel matrix for the wireless communication.

18. The electronic device of claim 17, wherein a channel state information is estimated as a channel state information matrix, a number of columns of the channel state information matrix being equal to or less than the number of columns of the MIMO channel matrix.

19. The electronic device of claim 14, wherein the capability information field further includes both implicit beamforming capability information and explicit beamforming capability information.

20. The electronic device of claim 14, wherein a number of the plurality of antennas is two or three.

* * * * *